July 3, 1962     E. LAVERDISSE     3,042,279
PROCESS AND APPARATUS FOR PRODUCING POLISHED GLASS
Filed April 3, 1957     2 Sheets-Sheet 1
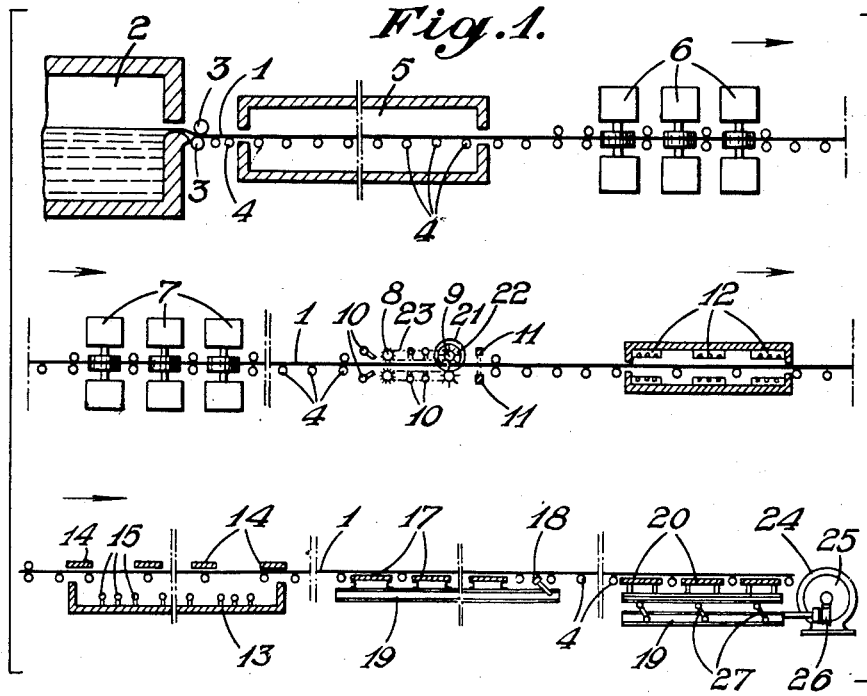
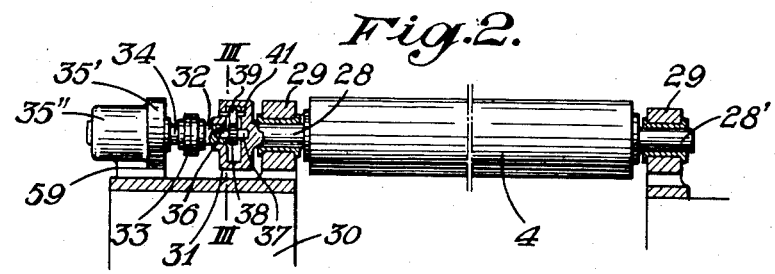
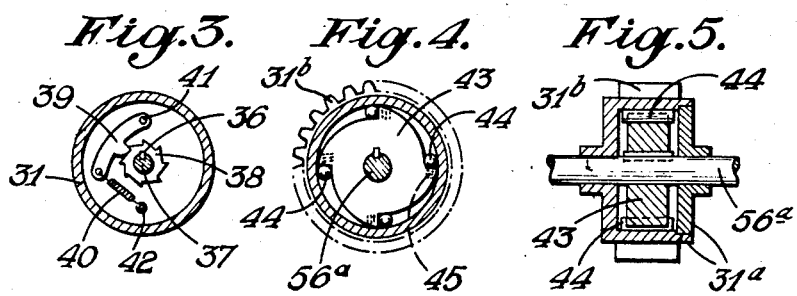

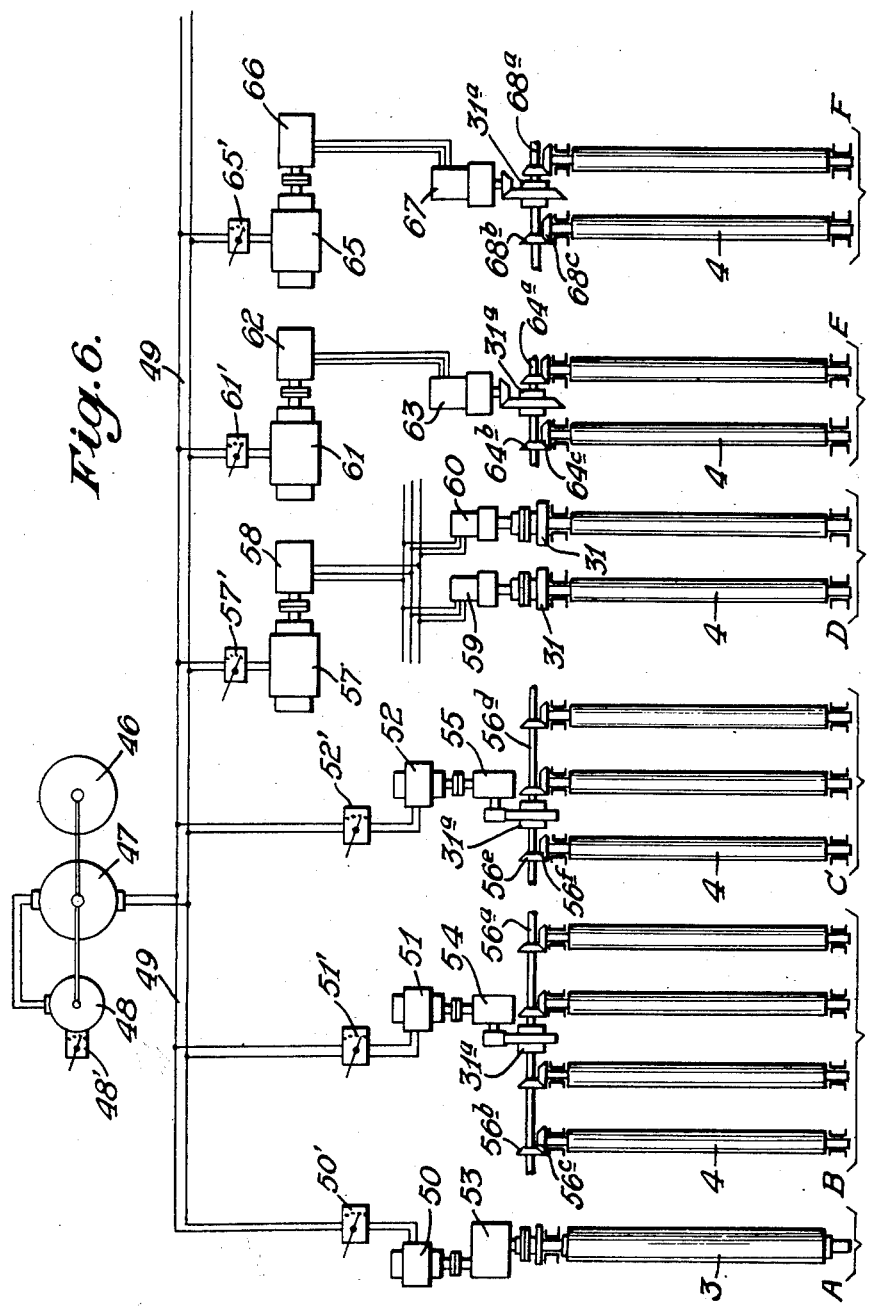

United States Patent Office 3,042,279
Patented July 3, 1962

3,042,279
PROCESS AND APPARATUS FOR PRODUCING POLISHED GLASS
Edmond Laverdisse, Auvelais, Belgium, assignor to Les Glaceries de la Sambre, Societe Anonyme, Auvelais, Belgium, a company of Belgium
Filed Apr. 3, 1957, Ser. No. 650,391
Claims priority, application Belgium Apr. 18, 1956
2 Claims. (Cl. 226—111)

The present invention relates to the control of the rolling cylinders and of the conveyor rollers in installations for the treatment of plate glass polished on both faces such as, for example in installations of the type described in British Patent No. 721,024, wherein the glass advances, in the form of a continuous ribbon, on a bed of conveyor rollers extending from rolling cylinders, through the annealing furnace, grinding devices, polishing devices and, beyond the latter, through washing apparatus, drying apparatus, an inspection chamber and cutting and lifting apparatus.

In known installations, the rotation of the conveyor rollers is effected either by means of a single transmission system rotating at constant speed or by means of a series of transmission sections rotating at different and generally progressively increasing speeds, so as to produce an increasing traction on the continuous glass ribbon.

The control of a number of conveyor rollers by a single transmission system involves the complete stoppage of all the rollers of the series in question when one of them is jammed either due to seizing of the control members or due to glass debris emanating from breakage. In the latter case, the disadvantages of the control of the conveyor rollers in series are particularly serious, because the glass fragments remaining on the rollers become fast thereon and the glass sheet which continues to advance under the impulse of the rollers situated upstream of the point at which the breakage occurs climbs on to them and breaks in turn. A pile of glass debris rapidly accumulates, which results in the complete stoppage of the apparatus.

It is obvious that similar difficulties may arise in the case of a breakdown of, or damage to, a motor for the individual or collective control of one or more conveyor rollers.

Moreover, breakdowns in the control of the rolling cylinders (a seized bearing or an electrical fault in the motor) immobilize the cylinders which, in contact with the glass, immediately become deformed and very frequently become unserviceable after return to normal conditions.

According to the present invention, these disadvantages are obviated by the application to all or some of the rolling cylinders and/or conveyor rollers to either an individual or a group-wise control of preferably variable-speed motors, through a unidirectional driving device of the "free wheel" type such as, for example, of the pawl and ratchet wheel type or other type, which permits free rotation of each rolling cylinder and/or of each conveyor cylinder or of each group of conveyor rollers in the direction of the feed of the glass ribbon in the event of an electrical or mechanical breakdown of the control.

The elimination of the reduction in the speed of advance of the glass ribbon by the unidirectional drive control also affords the advantage that it obviates the adverse effects (pulsatory rolling not compensated for by a sufficient speed of the conveyor rollers) which the said speed reduction may produce on the regularity of the rolling of the glass ribbon, notably in the case where the upper rolling cylinder is subjected to a straightening as in United States Patent No. 2,760,309.

In the accompanying drawings:

FIGURE 1 illustrates diagrammatically an overall view of an installation according to British Patent No. 721,024.

FIGURE 2 illustrates in side view and partly in section a unidirectional drive control of a conveyor roller according to the invention.

FIGURE 3 shows a transverse section along line III—III of FIGURE 2, on enlarged scale, FIGURES 4 and 5 respectively illustrate a transverse section and an axial section through a modified embodiment of the unidirectional drive control of a conveyor roller or of a rolling cylinder, and FIGURE 6 is a plan view of the system for the control of the rolling cylinders and of the conveyor rollers according to a preferred embodiment of the invention, the various groups of rollers shown in this figure corresponding to the respective apparatus and chambers of the installation according to FIGURE 1.

In FIGURE 1 is shown a continuous glass ribbon 1 originating at the melting furnace 2 and passing through zones constituted by the rolling cylinders 3, the conveyor rollers 4, the annealing furnace 5, the grinding apparatus 6, the polishing apparatus 7, the washing apparatus 8 to 11 and 21 to 23, the drying chamber 12, the inspection chamber 13 to 15, the station for cutting off the required volumes by scoring and breaking constituted by components 17 and 18 and the chamber for the devices for lifting and cutting to the final dimensions constituted by components 19, 20, and 24 to 27.

According to FIGURES 2 and 3, the control journals 28 and 28' of a conveyor roller 4 are mounted in bearings 29 fixed on the frame 30, journal 28 being provided with a flared sleeve 31, in which there is axially fitted the end 32 of the coupling 33, the other end 34 of which forms part of a combined motor and reduction unit 59 comprising a speed reduction gear 35', for example, of the epicyclic gear or planet wheel type controlled, for example, by an asynchronous motor 35" fed at variable frequency (see below).

Axially admitted into the end 32 of the coupling 33 and keyed by a key 36 is one of the ends of a shaft 37 of a ratchet wheel 38, the other end of the said shaft being axially engaged with a small friction force in the control journal 28 of the roller 4. The ratchet wheel 38 co-operates with a pawl 39 loaded by a spring 40, the said pawl and the said spring being attached to the sleeve 31 by pins 41 and 42 respectively.

It is obvious that the undirectional driving mechanism, instead of being of the pawl ratchet wheel type 38 to 42, may be of any appropriate type such, for example of the cam wheel type 43, comprising wedging rollers 44 and springs 45, as illustrated in FIGURES 4 and 5, according to which the sleeve 31a is fitted on a transmission shaft 56a and is provided with peripheral teeth 31b intended to be acted on by a reduction unit (see below).

The control system illustrated in FIGURE 6 comprises a Ward-Leonard set composed of an alternating-current motor 46, a direct-current generator 47 and an exciter 48. The voltage across the terminals of the generator 47, which is adjustable in the ratio of, for example, 10 to 1 (or in any other appropriate ratio) by simple operation of the rheostat 48' of the exciter 48, is transmitted by the conductors 49 to the terminals of the direct-current motors 50, 51, 52, 57, 61, 65. The motor 50 controls through a reduction gear 53, for example of the worm wheel type, and a unidirectional driving mechanism, for example of the type including elements 31 to 42 described in the foregoing, the rolling cylinders 3.

The motor 51 controls through a reduction gear 54 of the same type as 53, and through a unidirectional driving mechanism of the type including elements 31b, 31a to 42 (FIGURE 5), the transmission shaft 56a, which drives the conveyor rollers 4 through the bevel gears 56b, 56c from the rolling cylinders 3 to the outlet of the annealing furnace 5. Similarly, the motor 52 controls through a reduction gear 55, of the type 53, and a unidirectional driving mechanism of the type 31b, 31a to 42, the transmission shaft 56d which drives the conveyor rollers 4 through the bevel gears 56e, 56f from the outlet of the annealing furnace 5 to the grinding apparatus 6.

The conveyor rollers 4 situated in the grinding apparatus 6 and in the polishing apparatus 7 are driven by one or more frequency changer sets, each of which is composed of a direct-current motor 57 which drives an alternator 58. Connected in series with the said alternator are the combined alternating-current motors and reduction gears 59, 60, etc., which act individually on the conveyor rollers 4 at 6 and 7.

The conveyor rollers 4 associated with the following zones, viz: with the washing apparatus 8 to 11, with the drying chamber 12, with the inspection chamber 13 to 15, with the station for cutting the glass ribbon to the required lengths 15 to 18, and with the chamber for the lifting and final cutting devices 19 to 27, are controlled either individually by combined alternating motors and reduction gears 63, 67, etc. fed by frequency changer sets 61, 62, 65, 66, etc. respectively, which are identical to the systems 57, 58, 59, 60 described in the foregoing, or as illustrated, i.e. collectively by transmission systems 64a, 64b, 64c and 68a, 68b, 68c acted on respectively, if desired through a undirectional driving device 31b, 31a—42, by combined alternating-current motors and reduction gears 63, 67 etc. fed by frequency changer sets 61, 62, 65, 66 etc., respectively.

Each of the direct-current motors 50, 51, 52, 57, 61, 65 is provided with a field rheostat 50', 51', 52', 57', 61', 65' which permit varying its speed, for example by ±25%, at a voltage adjustable in a ratio of 10 to 1, which is received from the Ward-Leonard set 46, 47, 48, so that the total speed of these motors can be varied in a ratio of 1 to 10 by variation of the direct-current feed voltage, and individually by ±25% by operation of the field rheostat.

By applying this adjustment, for example, to the motors 57, 61, 65 of the frequency changer sets 57—58, 61—62 and 65—66, this frequency of 10–100 cycles per second can be varied by ±25%. The alternating-current motors 59, 60, 63, 67 thus rotate at speeds varying in the same proportions.

It is similarly possible to establish speed stages of, for example, 1.00 m./sec. for the zone A (FIGURE 6), 1.05 m./sec. (±5%) for the zone B, 1.10 m./sec. (+10%) for the zone C, 1.12 m./sec. (+12%) for the zones D, 1.15 m./sec. (+15%) for the zones E, and 1.17 m./sec. (+17%) for the zones F.

The undirectional driving device 31—42 may be connected in all the controls, both collective and individual, as illustrated by way of non-limitative example in FIGURE 6. The free-wheel control would be desirable in all cases, but it is more costly than the rigid control, and its application can therefore be reserved for the places where breakages are the most frequent and the most harmful, that is to say, for the zones 6 and 7(D), in which the glass is subjected to the stresses of grinding and polishing.

On the other hand, the individual control, such for example as 59, 31—42 and 60, 31—42, can be usefully applied to the zones such as 6 and 7(D) in which a collective transmission, such as 56a, 56d, 64a, 68a, makes access to the apparatus more difficult.

It is to be noted that any change may be made in the speed of the rolling and consequently of the conveyance simply by operating the rheostat 48', of the exciter 48, which produces a ± variation of the voltage at the generator 47. This variation of the voltage effects without further assistance a general adaptation of the new successive speed levels to the new rate of feed of the glass. All the speeds are brought into agreement immediately the action is taken. Slight differences due to small dissimilarities in the electrical characteristics of the motors may occur without any appreciable disadvantage and will be corrected by the individual adjustment of the direct-current motors 50—51, 52—57—61—65, for example with the aid of their respective field rheostats 50', 52', 57', 61', 65'.

It will be understood that the construction and the arrangement of the undirectional driving mechanism of the free-wheel type, as also those of the electric control devices and of the electric and/or mechanical speed-changing or reduction devices may be modified without departing from the scope of the invention.

What is claimed is:

1. A glass treating system comprising a plurality of zones including, at least, glass polishing, grinding and washing zones for effecting sequential glass processing steps, a plurality of rollers for conveying a continuous strip of glass through the zones, a source of rotary power adapted for driving the rollers, and a plurality of mechanical driving devices having free wheeling characteristics in the direction of glass conveyance and coupling said source to the rollers in the respective zones for the driving of the same while permitting the rollers in the zones to be rotated by said continuous strip; said source of rotary power comprising an alternating current motor, a direct current generator driven by said motor and means for varying the voltage of said generator, a plurality of direct current motors connected to said generator, a rheostat coupled to each of said direct current motors for varying the speed thereof, each of the direct current motors being operatively coupled to the rollers of a corresponding zone for driving the same at a determinable speed, and an alternator driven by at least one of said direct current motors, the latter said alternator and direct current motor constituting a frequency changer, and at least one alternating current motor connected to said alternator and operatively connected to the rollers corresponding to said one direct current motor for driving said rollers.

2. A glass treating system as claimed in claim 1 wherein said zones further include annealing, drying, inspection, cutting, lifting and final cutting zones, said plurality of rollers including a pair of rollers for driving said continuous strip of glass towards said zones, said pair of rollers being coupled to another one of said direct current motors, said plurality of rollers further including conveyor rollers between said pair of rollers and said annealing zone and coupled to a third direct current motor, and conveyor rollers between the annealing zone and the grinding zone and coupled to a fourth direct current motor; a second alternating current motor connected to the alternator of the frequency changer in parallel relation with said one alternating current motor, said plurality of rollers further including conveyor rollers in the grinding zone and the polishing zone, the latter rollers being the rollers corresponding to said one direct current motor, the conveyor rollers in the grinding zone being connected to one of the alternating current motors, the conveyor rollers in the polishing zone being connected to the other of the alternating current motors; two further frequency changers, an alternating current motor coupled to each of said further frequency changers, said plurality of rollers further including conveyor rollers in said washing, drying, inspection, cutting, lifting, and final cutting zones coupled to the alternating current motors which are coupled to said further frequency changers.

References Cited in the file of this patent

UNITED STATES PATENTS

| | | |
|---|---|---|
| 1,638,769 | Hitchcock | Aug. 9, 1927 |
| 1,879,720 | Reis | Sept. 27, 1932 |
| 2,176,480 | Waldron et al. | Oct. 17, 1939 |
| 2,203,182 | Rendall | June 4, 1940 |
| 2,270,362 | Waldron et al. | Jan. 20, 1942 |
| 2,701,049 | Kendall et al. | Feb. 1, 1955 |
| 2,715,959 | Zelley | Aug. 23, 1955 |

FOREIGN PATENTS

| | | |
|---|---|---|
| 410,547 | Great Britain | May 24, 1934 |
| 163,225 | Australia | June 6, 1955 |